United States Patent [19]

Toepfer et al.

[11] Patent Number: 5,011,236
[45] Date of Patent: Apr. 30, 1991

[54] PROCESS FOR CARRYING OUT A LOAD-DEPENDENT BRAKE REGULATION OF BRAKES ON A VEHICLE HAVING AN ANTI-LOCK SYSTEM

[75] Inventors: Bernhard Toepfer, Stuttgart; Michael Reiner, Fellbach, both of Fed. Rep. of Germany

[73] Assignee: Daimler-Benz AG, Fed. Rep. of Germany

[21] Appl. No.: 402,538

[22] Filed: Sep. 5, 1989

[30] Foreign Application Priority Data

Sep. 3, 1988 [DE] Fed. Rep. of Germany ....... 3829951

[51] Int. Cl.$^5$ .............................................. B60T 8/60
[52] U.S. Cl. ..................................... 303/100; 303/95; 303/DIG. 4; 364/426.02
[58] Field of Search ........................ 303/93, 94, 95, 96, 303/100, 103, 106, DIG. 3, DIG. 4; 364/426.02, 426.03

[56] References Cited

U.S. PATENT DOCUMENTS 4,822,113  4/1989  Amberg et al. ...................... 303/100
4,863,221  9/1989  McNinch, Jr. ................... 303/100 X

FOREIGN PATENT DOCUMENTS 0149137 12/1984  European Pat. Off. .
0173954  8/1985  European Pat. Off. .
2622746 11/1977  Fed. Rep. of Germany .
3226074  9/1983  Fed. Rep. of Germany .
3301948  7/1984  Fed. Rep. of Germany .
3711175 10/1987  Fed. Rep. of Germany .

*Primary Examiner*—Duane A. Reger
*Attorney, Agent, or Firm*—Evenson, Wands, Edwards, Lenahan & McKeown

[57] ABSTRACT

A process for load dependent braking regulations (ALB) utilizing components, signal paths and transmitters of an existing anti-lock braking system (ABS) to perform an automatically load-dependent braking function which takes effect well below the locking limit. The brake pressure and consequently the brake distribution are controlled by processing only wheel-speed differences as actual values of an electronic brake-pressure controller instead of absolute wheel slips. To compensate for changing load situations and roadway properties, the precontrollable brake-force distribution and the brake-pressure level control triggerable at the pedal are corrected in a self-learning and adaptive manner. The device for carrying out the ALB process consists essentially of a computer and software program using input from the ABS systems. The process according to the invention makes axle-load sensors superfluous.

22 Claims, 2 Drawing Sheets

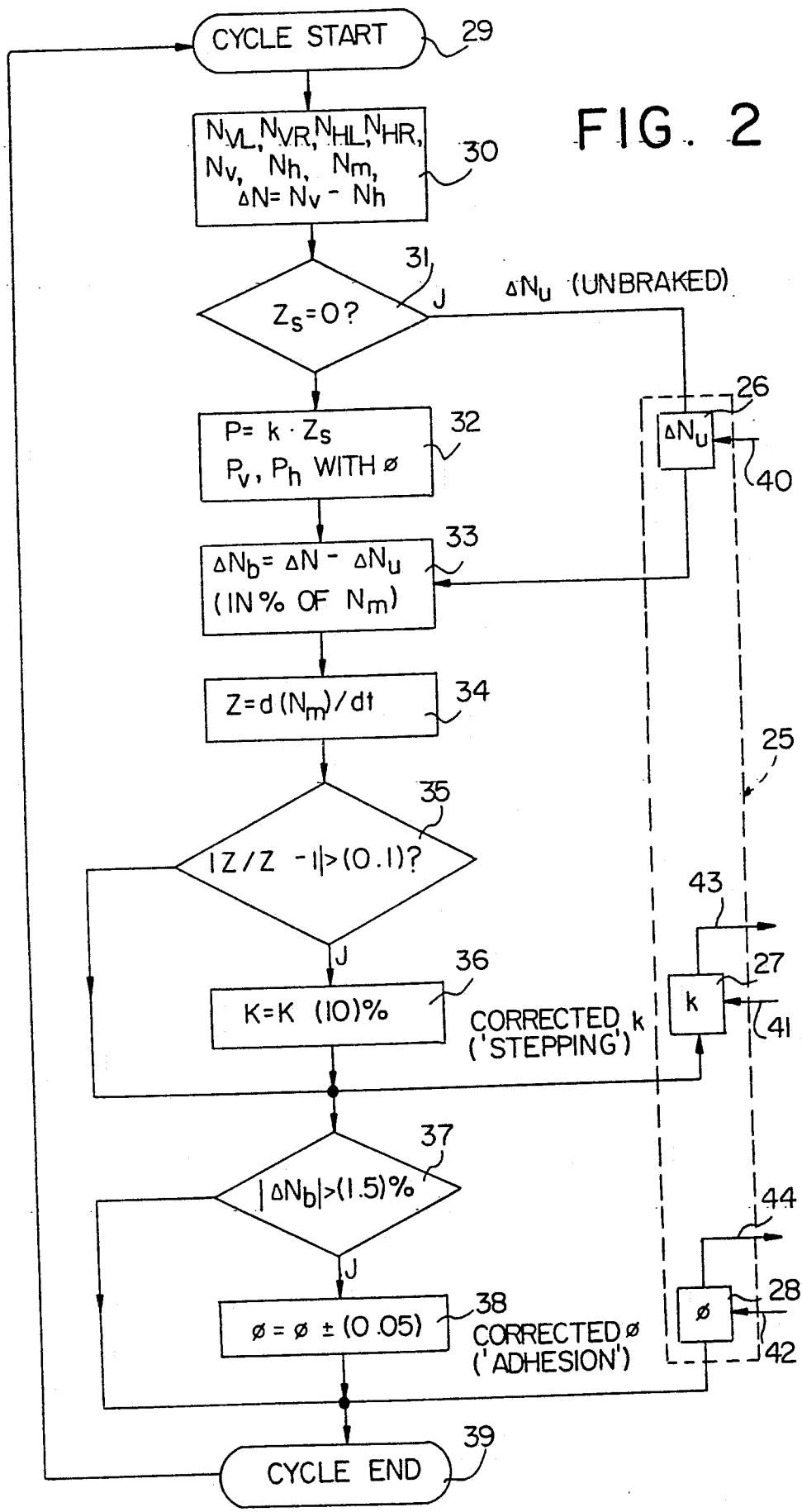

PROCESS FOR CARRYING OUT A LOAD-DEPENDENT BRAKE REGULATION OF BRAKES ON A VEHICLE HAVING AN ANTI-LOCK SYSTEM

BACKGROUND AND SUMMARY OF THE INVENTION

The inention relates a process for carrying out a load-dependent regulation of the brake pressure on a commercial vehicle, equipped with an electrically acting anti-lock system (ABS) and with an electronic central control and ABS brake valves located near the vehicles axles. Rotational-speed transmitters assigned to the brakeable wheels, serve as instantaneous wheel speed sensors for an ABS control which takes effect at a wheel brake pressure near the locking limit.

In modern conventional commercial-vehicle brake systems, an automatically load-dependent brake (abbreviated hereafter to ALB) is usually provided in order to allow for large rear-axle load differences between empty and loaded vehicles as efficiently as possible in braking terms.

An object of such systems is to influence the brake forces mainly on the rear axle according to the lower axle load in the event of part loading Also, under specific preconditions the central should influence the brake forces on the front axle by a load-dependent reduction of the brake pressure set by the brake pedal and therebY to primarily counter the danger of skidding arising from over-braked rear axles. Furthermore, a reduction of the brake-pressure level under part loads is also desirable in order to ensure a finely stepped brake actuation. In air-suspension vehicles such as shown in DE-05 37 11 175, accordion pressure between tractor and trailer; and in steel suspension vehicles the axle compression travel transmitted via a linkage, or the electrical signal from a pressure-sensitive or tension-sensitive electronic load transmitter preceding a spring bearing, are all used are a measure of the input quantity indicating the axle load.

These types of systems have disadvantages. Influencing of at least one axle-specific brake-pressure regulating valve mechanically is susceptible to damage under rough operating conditions. Another disadvantage is that it is even necessary to have appropriate activating elements in diverse and often even non-uniform versions even within a vehicle model series.

A load detection system based on a transmission linkage is inaccurate for ALB control. For example, in a common brake-pressure control of the axle groups of vehicles with leading or trailing axles or with hard suspension transmission linkage controls would be inaccurate. Also such controls entail considerable costs.

It has already been proposed to regulate the brake pressures in axle terms according to the absolute wheel slip, or alternating to adjust the brake-pressure distribution so that specific wheel-slip relations between the axles are established. However, such solutions have proved unsatisfactory, because, for the lack of a reliable reference speed of non-braked wheels, the absolute wheel slips in the braked vehicle can be determined only approximately, and because of production divergences in the tires, even exactly determined slips, do not offer reliable information on actual adhesion stress.

In contrast to this, an object of the invention is to utilize tried and tested and robust components, signal paths and transmitters of an existing anti-lock braking system (abbreviated hereafter to ABS) and thereby perform an automatically load-dependent braking function, taking effect well below the locking limit. For this, the invention provides a process which also makes it possible to regulate the brake pressure and consequently the brake-force distribution well below, the locking limit, at least specifically in axle terms With such a regulation, it is also then possible to select higher brake pressures than hitherto customary on the front axle, independently of the brake-pressure control on the rear axle. By an appropriate extension of the microprocessor program of the electronic ABS controller, there is no need for the mechanical (or, in electropneumatic brake systems, the additional electronic) wheel-load or axle-load sensors.

The process proposed by the invention thus allows a considerable simplification and increase in reliability of a load-adaptive brake system for commercial vehicles by minimizing the number of signal transmitters required and their necessary connections to an electronic control unit.

Other objects, advantages and novel features of the present invention will become apparent from the following detailed description of the invention when considered in conjunction with the accompanying drawings.

BRIEF DESCRIPTION OF THE DRAWINGS

FIG. 2 shows a flow diagram of the process.

DETAILED DESCRIPTION OF THE DRAWINGS

Figure 1:
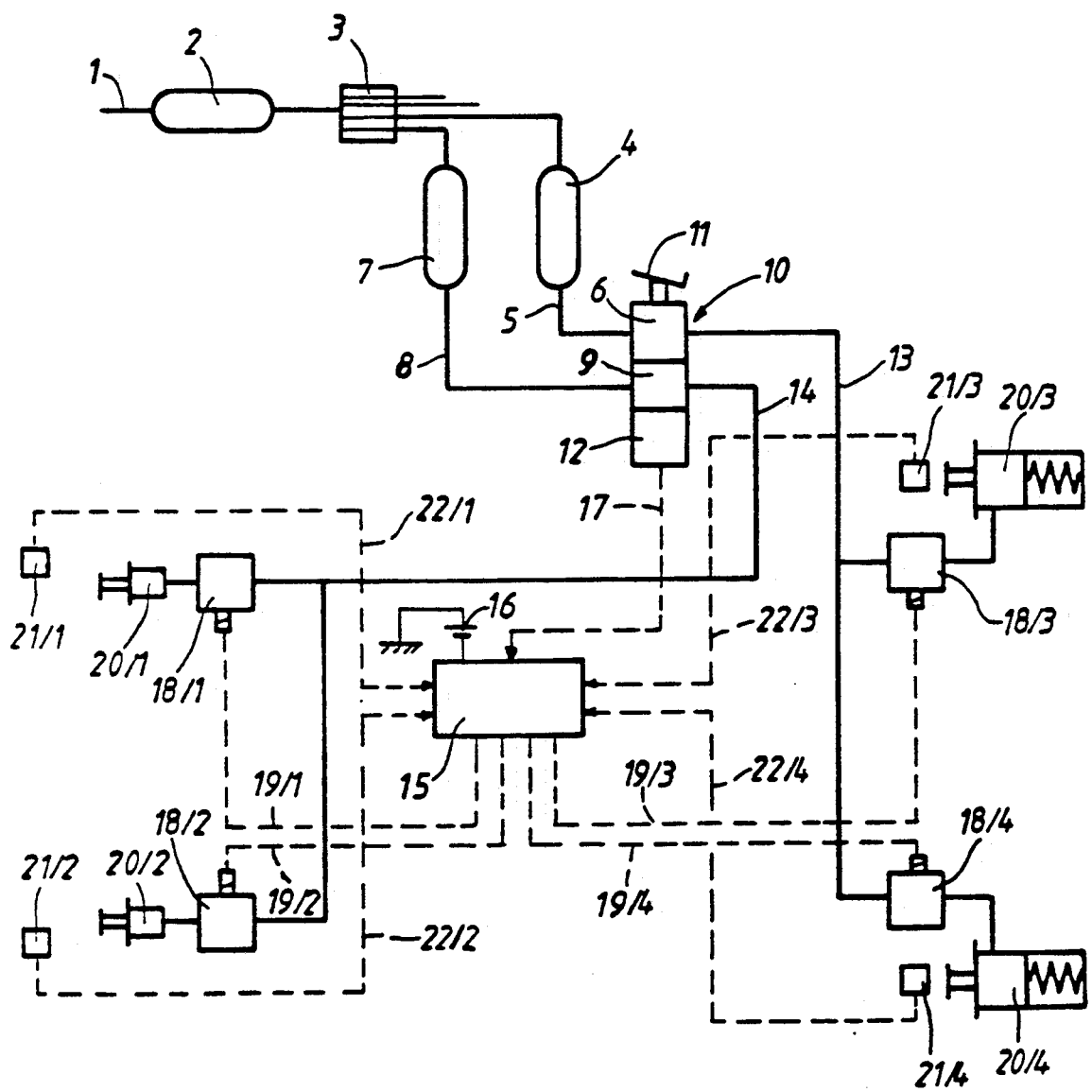
FIG. 1 shows components of a control installed on a vehicles chasis.

According to FIG. 1, the control comprises known components from high-grade electronic ABS systems and with a central control and ABS valves located near the wheels. Systems of this type control wheel brake pressures as a function of wheel speeds utilizing wheel-rotation sensors to prevent locking of individual wheels when the adhesion limit defined by the tire/road friction is reached by reducing, or at least not further increasing, the brake pressure as long as the locking tendency persists.

To accomplish the goals of the invention a reservoir 2 is supplied with pressure medium by means of a feed line 1 coming from an air compressor (not shown). This pressure medium passes via a multi-way safety valve 3 into sub-reservoirs 4 and 7 of a plurality of brake circuits. These sub-reservoirs 4 and 7 are assigned to a front-axle and a rear-axle brake circuit of the vehicle respectively. Pressure medium flows via supply lines 5 and 8 to two individual sections 6 and 9 of the operating brake valve 10, which is actuated by the pedal 11. This valve, or pedal has an electrical pressure recorder, or a position or location transmitter 12 and is connected positively to the pedal 11, or to the valve drive actuated by it. Pressure lines 13 and 14, located on the outlet side of valve 10, supply pressure-medium to ABS valves 8/1, 18/2 and 18/3, 18/4 belonging to two different axles and installed near the axles. The valves 18/1 18/2 and 18/3, 18/4 are each assigned to brake cylinders 20/1, 20/2 and 20/3, 20/4 of a front axle and a rear axle of the vehicle. The valves are controlled electrically via control lines 19/1 to 19/4 by an electronic central control unit 15. Wheel-speed sensors 21/1 to 21/4 record the speeds of the wheels continuously and transmit wheel-specific speed signals to the electronic central control unit 15 via corresponding lines 22/1 to 22/4.which are fed from an electrical energy source 16.

The valves 18/1 to 18/4 are of conventional design to ABS valves already used in conventional compressed-air operating brake systems with a superposed electronic ABS. However, in this regard, the device can also be equipped with more robust versions with a longer lifetimes because according to the invention these valves act as operating brake valves in a selection range, wider than the relatively narrow locking-limit range, and are therefore exposed to a higher control utilization than valves of purely ABS use.

In the design of a conventional ABS system intended for conventional functions, this device could not replace or could only partially replace the function of the ALB. This is because a conventional ABS system comes into action with the effect of a load-dependent brake, only in response to extreme braking or highly adverse and rarely encountered road conditions. As a rule, a normal ABS cannot match the normal braking forces to a proper loading state in the range of frequent braking with decelerations of below 2.5m/s$_2$.

More important than an appropriate modification of the ABS valves 18/1 to 18/4 in relation to those normally used in conventional electronic ABS systems (hardware modification) is the software modification of a conventional electronically acting ABS system by an extension to include the ALB routine according to the invention. This.modification is integrated into, or supplemental to the actual ABS program as an additional program which access a few fixed values (the parameters and wheel speeds) as actual values of the ABS system. At all events, this additional program contains special filter functions and smoothing algorithms for wheel-speed differences of low limiting frequency.

The process which can be carried out by means of such a device remedies the ALB unsuitability of a conventional electronic central ABS control unit It makes it possible to modify an ABS system to incorporate an ALB function, even in the deceleration range below 2.5m/s$_2$, without the braking comfort under changing load being impaired, so that hitherto customary additional components and installations on the chassis for performing an ALB function become superfluous In addition, the determination of absolute wheel slips is abandoned completely. Instead, the criterion used for evaluating the wheel-speed signals supplied by the wheel sensors, is the exceeding of a somewhat approximate mid-axle wheel-speed difference threshold. This allows one to initiate a cutback forward of the brake pressure on the axle in question (for example, by means of pressure-step modulation in the case of a brake-force distribution not matched to the load For this, the differences in the wheel speeds during braking are determined and disturbing influences (such as offset errors arising from different tire diameters) are compensated by comparison with wheel speeds during non-braked motoring by means of a simple software standardization routine. The interference-suppressed speed differences then correspond in a first approximation to actual slip differences. Since the tire-slip characteristics can have deviations because of different tire properties and a differing tire utilization, a limiting value, taking these deviations into account is fixed for admissible divergences of the mid-axle wheel speeds during braking. As long as this limiting value is not exceeded, a predetermined brake-pressure distribution remains unchanged. If this limiting value is exceeded, it is corrected by reducing the limiting value. Thus, if only this limiting value can be selected low enough, a regulation of a brake-force distribution in a slip range in which a normal ABS is completely ineffective, becomes possible, even well below the locking limit. According to the invention, a mid-axle speed divergence in a range of 1% to 7% is proposed as a limiting value in order to perform a responsive and comfortable ALB function by the attendant use of an ABS system. A speed divergence of this order of magnitude can be detected reliably and cost-effectively by means of the wheel-speed sensors already used as standard today in anti-lock systems.

Furthermore, in order to relieve the regulating device and improve comfort, the control process minimizes the number of constantly recurring regulating cycles, occurring during each individual journey, with a load state unknown per se. A brake-pressure distributions $P_{v(front)}/P_{h(rear)}$ detected or related to this specific payload or payload distribution are stored by taking the corrected or updated brake-pressure distributions $\phi$ as current output values as a basis for subsequent braking (continuous adaptation of the brake-pressure distribution).

Because of the aim and control characteristic, which are changed in relation to a pure ABS function, a separate or parallel evaluation of speed signals for the ALB function is expedient as an addition to a conventional electronic ABS control in the central electronic control unit 15. Since for a sufficiently fast response behavior, the ABS function allows only a limited smoothing or filtering for suppressing interference of signals, whereas the ALB function requires a substantially lower limiting frequency of a filtering of values to be stored (in order to accommodate non-round tires or tires running at the wear limit), it is still possible to obtain low-offset value settings and therefore an effective utilization of the ALB function and a sensitive response.

To minimize disturbing influences arising from speed differences, for example during braked cornering, the formation of axle-related average values of the speed divergences, as input quantities for the load-dependent brake-pressure regulation in the range below the locking limit, is provided in a parallel with the ABS function.

The process for the wheel-speed-assisted adaptive optimization of precontrollable mid-axle brake-pressure distributions can be extended in a simple way in software terms by incorporating an adaptation of pressure stepping. The stepping determines the overall driver response resolution on the brake pedal for the desired deceleration. Together with the ALB function, this extension causes an even more sensitive handling of the vehicle up to the adhesion limit between tire and the road, and over the total service life of the brake linings, a uniform suppression of the braking attack, independently of the load state.

The computing routine, according to the process, for the stepping and adhesion adaptation is illustrated as a flow diagram in FIG. 2.

Before the start of the journey, the value zero is filed in the register cell 26 in a braking computer memory 25. A starting parameter $k_o$, different from zero, for the pressure level P required for a specific braking deceleration per unit of pedal deflection, is filed in the register cell 27 (thus influencing the stepping or pedal resolution). A starting parameter $\theta o$, different from zero, for the mid-axle brake-pressure distribution $\theta$ is filed in the register cell 28 (thus influencing the adhesion). Beginning with an initiating step 29, at the start of the journey, the following cycle is activated and then run through every 10 to 50 ms:

In a step 30, first the front and rear individual wheel speeds $N_{VR}$, $N_{VL}$, $N_{HR}$, $N_{HL}$ are measured continuously, and from these are calculated axle-related average values $N_v$, $N_h$, and absolute overall speed average $N_m$ and the difference $\Delta N = N_v - N_n$ of the wheel speeds averaged in axle terms.

In the subsequent step 31, there is an interrogation as to whether the braking requirement (desired-value setting according to the driver's requirements $Z_s$ is equal to zero. If this is the case J, there is no braking requirement and the current wheel speeds can be evaluated as essentially free of slip. In the thus non-braked state, after statistical smoothing or low-pass filtering, the current difference $(N_v - N_h)$ of the wheel speeds averaged in axle terms, is then filed as delta $N^u$ in the register cell 26 of the braking computer memory 25 and the initial value zero, or the particular value stored in it is thus overwritten. This stored value therefore represents the non-braked speed offset resulting from diverging tire sizes or rolling circumferences, and/or diverging tire pressures and consequently also differing rolling radii. The above-mentioned soothing or filtering eliminates fluctuations ("swinging") of the value delta $N^u$ as a result of non-round tires, cornering and drive slip etc.

If a braking requirement differing from zero (desired-value setting by the driver) is obtained from step 31, a desired brake-pressure level P corresponding to the product of the desired deceleration $Z_s$ and a factor k determining the brake-pressure level P is created in the step 32. From this desired brake-pressure level P, a front-axle brake pressure $P_v$ and a rear-axle brake pressure $P_h$ are created according to a pressure-distribution parameter $\phi$ by means of an appropriate axle-related control of the wheel-brake valves.

In step 33 the mid-axle speed difference delta N is determined in the braked state in the manner performed in step 31 for the non-braked state. From this is subtracted the currently stored value delta $N_u$ in the previously non-braked state. This results in a standardized speed difference delta $N_b$ from which wheel influences have been eliminated. Furthermore, the average value of the wheel speeds $N_m$ is differentiated in the subsequent step 34 to obtain the braking desired deceleration Z. limiting-value checks 37 and 35 regarding delta $N_b$ and Z are now provided hereafter for the adaptive correction of the brake-pressure distribution $\phi$ and brake-pressure level P.

Step 35 serves for adapting the stepping of the braking deceleration at the pedal to the system. In this step, there is interrogation whether the divergence from 1 of the actual deceleration Z, standardized relative to the current desired deceleration $Z_s$ is higher than a predetermined first limiting value of, for example, 0.1. If this is not the case, the specific brake-pressure level P (predetermined at the start of the journey or during initiation by the starting parameter $K_o$) is maintained, and the current parameter K thus remains stored in the storage cell 27. If the value is higher (J) an increase or decrease of K by a fixed increment/decrement of, for example 10%, takes place in the step 36. To make the adaptation as fast as possible, the amount of the change (in steps) is selected adaptively according to the amount of difference exceeding the 0.1 limit. The parameter K as thus modified is then written over the preceding one in register cell 27 (if appropriate, after statistical smoothing or low-pass filtering) and as an updated value is fed to the ALB brake control circuit as a pilot quantity via a path 43 indicated symbolically.

The step 37 serves for adapting to adhesion conditions. In this step, there is interrogation whenever the divergence, calculated in step 33, of the mid-axle speed difference during braking $N_b$, is higher in terms of its amount than a predetermined second limiting value of, for example, 1.5%. If it is not higher, the specific brake-pressure distribution predetermined (at the start of the journey or during initiation by the starting parameter $\phi_o$) is maintained, and the current parameter $\phi$ therefore remains stored in the storage cell 28. If it is higher, case (J), an increase or decrease of $\phi$, for example by a foxed increment/decrement of 5%, takes place in the step 38. To make the adaptation as fast as possible, the amount of this change in steps is selected adaptively according to the amount of difference exceeding the 5% limit. The parameter $\phi$ thus modified is then written over the preceding one in the register cell 28 (if appropriate, after statistical smoothing or low-pass filtering) and as an updated value is fed to the ALB brake control circuit as a pilot quantity via a path 44 indicated symbolically.

The sequence of the interrogations 35 and 37 can also be interchanged. After these interrogations have been run through, the cycle end 39 is reached. From this, the cycle start 29 is called up at the request of the ALB brake program. Between the cycle end 39 and the cycle start 29, the operational program of the electronic central control unit can have a delay time which is fixed (for example 20 to 100 ms) or is variably controllable as a function of the braking frequency or of the frequency of the exceeding of the limiting value. This time is greater than the processing time of the ALB program according to the flow diagram. Thus, the ALB program can be slipped as a latent task into a ABS program, with the effect that, in a dangerous situation demanding the immediate utilization of the limiting adhesion at the locking limit and consequently the ABS function, an ALB routine just running only rarely has to be interrupted with a low degree of probability. In this way, (in statistical terms) the response time of the ABS function is lengthened only very slightly, and at all events negligibly in practice. Moreover, an early response of the ABS function is prevented in a desirable way by the adhesion-matched brake-force distribution, which also takes into account the current tire/roadway friction conditions. These factors too reveal the high gain in functional capacity of conventional ABS control processes and devices which, by means of process according to the invention for performing an ALB function, are to be extended essentially only by software means. Use of this software correction is extremely cost-effective, because the wheel-speed transmitters necessary for the ABS function are sufficient, that is to say further transmitters are therefore superfluous.

There are also loading paths 40, 41, 42, by means of which the operational master program of the electronic central control unit 15 can conditionally change at least one of the contents of the storage cells 27, 28 and 26, i.e. the parameter K or $\phi$ or the real-time value delta $N_u$.

For example, a specific type of trailer or semi-trailer can be coded and when such a trailer is coupled to the still stationary traction vehicle, it is possible to use a modified starting parameter $k_o$ and/or $\phi_o$ which is better suited as an initial value to a situation with separated chassis. This allows for a maximum speed of the ALB initial adaptation (start-up learning), without the response delay of the ABS function initially being impaired.

As the process only required the speed signals of the ABS wheel sensors as input quantities, it can easily be implemented even in the most diverse electronic ABS control units. The scope of the invention is therefore in no way exceeded if, instead of an electronic ABS central control unit of specific design or specific to a particular manufacturer, any such unit serves as a component of the device according to the invention, provided that it requires no further transmitters other than wheel-speed transmitters for its operation.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Process for carrying out a load-dependent brake regulation of brakes on a commercial vehicle equipped with an electrically acting anti-lock system having an electronic central control and ABS brake valves adjacent the axle of the vehicle and possessing rotational-speed transmitters assigned to each brakeable wheel for providing instantaneous whee speed for an ABS control;
   providing a load dependent regulation that is effective at a wheel brake pressure near a locking limit of the brakes; and
   automatically regulating mid-axle brake-pressure distribution solely according to wheel-speed signals supplied by the rotational-speed transmitters, in a slip range below a range in which the ABS function takes effect;
   wherein the automatic regulation of the brake-pressure distribution only occurs upon exceeding of a first predeterminable brake value in response to a correctable difference between mid-axle wheel speeds during braking.

2. Process according to claim 1, further comprising detecting the mid-axle wheel speed difference in a non-braked state before the braking operation, detecting the mid-axle wheel-speed difference during braking, and determining the correctable difference between mid-axle wheel speeds during braking by subtracting the mid-axle wheel speed difference detected in the non-braked state before the braking operation, from the mid-axle wheel-speed difference detected during braking.

3. Process according to claim 1, further comprising correcting mid-axle brake-pressure distribution in an adaptive self-learning manner, starting from a stored starting reference value corresponding to at least one of a vehicle-specific and a load-specific value.

4. Process according to claim 3, wherein the step of correcting the mid-axle brake-pressure distribution takes place in steps of a fixed increment.

5. Process according to claim 4, wherein the fixed increment is ±2 to 10% of a previous correction value of the mid-axle brake-pressure distribution.

6. Process according to claim 3, wherein the step of correcting the mid-axle brake-pressure distribution takes place in steps and further comprising controlling an amount of correction, starting from a minimum value as a function of an amount by which the predeterminable fixed first limiting value is exceeded by the correctable difference between mid-axle wheel speeds during braking.

7. Process according to claim 1, wherein said correctable value is between 1 and 7% of average axle speed during braking.

8. Process according to claim 3, further comprising the step of temporarily changing the stored value for the mid-axle brake-pressure distribution for adaption to a load differing characteristically from a reference load by a correspondingly different and initially non-adapted value.

9. Process according to claim 1, further comprising the step of automatically regulating total brake-pressure level via a reference factor by evaluating wheel-speed signals supplied by the wheel-speed transmitters during a slip range below the range in which the ABS function takes effect; and
   wherein said step of automatically regulating total-brake pressure level upon an exceeding of a second predeterminable limiting value by an amount of a quotient of actual braking quantity and a desired braking quantity less one.

10. Process according to claim 9, wherein desired braking quantity is obtained from at least one of a brake pedal and brake valve position according to driving requirements.

11. Process according to claim 10, further comprising the steps of predetermining a value for the desire braking quantity as a function of the position of the brake pedal by differentiation of the averaged wheel speed during braking; and
   correction the total brake-pressure level as a change of a correction reference takes place when the difference between said quotient and the value exceeds a limiting value.

12. Process according to claim 10, further comprising the step of correcting the correction reference, determining the total brake-pressure level, in an adaptive self-learning manner, starting from a first starting value related to at least one of a vehicle-specific and load-specific condition.

13. Process according to claim 12, wherein the step of correcting the correcting reference takes place in steps of fixed increments.

14. Process according to claim 13, wherein said increments are ±5 to 15% of the value last obtained for the connection reference.

15. Process according to claim 12, wherein the step of correcting of the correction reference takes place in steps, the amount of which is dependent on the amount by which the predeterminably fixed second limiting value is exceeded by the amount of the quotient of the actual braking and desired braking less one.

16. Process according to claim 9, wherein the second limiting value is between 0.02 to 0.15.

17. Process according to claim 12, further comprising the step of replacing the correction reference, for adaption to a load differing characteristically from a reference load, by a correspondingly different and initially non-adapted value.

18. Process according to claim 1, further comprising evaluating the wheel speeds before the difference formation by averaging axle wheel speeds.

19. Process according to claim 12, wherein the step of correcting the correction reference is performed before a first braking on the basis of at least one of coded information relating to a carried commercial load and whether one has a trailer/semi-trailer, and on response to wheel speeds in the non-braked state.

20. Process according to claim 19, further comprising the step of calculating initial values for mid-axle brake distribution and the reference correction on the basis of stored data of the vehicles.

21. Apparatus for carrying out comprising:
a pressure-medium supply device for activating vehicle brakes in response to a pedal-actuable operating brake valve, said supply medium being divided into at least two pressure-medium circuits containing vehicle brakes located adjacent vehicle wheels;
an electrical sensor indicating the pressure level predeterminable by the pedal; p1 a central control unit receiving wheel-speed signals and a signal of brake-pressure level as adjusted by the operating brake valve for controlling electrical ABS brake valves assigned to individual vehicle wheels for ABS control;
wheel-speed signal transmitters assigned to individual vehicle wheels and connected to the central control unit;
electrically controllable ABS valves, connected to the central control unit via lines that are also controllable to activate the wheel brakes for said ABS control outside the wheel-slip range at the locking limit; and wherein
the electronic central control unit contains a computer to form wheel-speed differences and time differentials of wheel speeds which serve as input quantities both for an ABS control function and for an ALB control function.

22. The apparatus according to claim 21, wherein the central control unit includes means for filtering or averaging differently wheel-speed differences for the ABS function and for the ALB function, wherein average axle speed values and a total average value of the wheel speed and its time derivation are used for the ALB function.

* * * * *